United States Patent [19]

Comer

[11] 4,227,280
[45] Oct. 14, 1980

[54] VACUUM/BLOWER ATTACHMENT FOR FILAMENT TRIMMER

[75] Inventor: Robert C. Comer, Hopkins, Minn.

[73] Assignee: The Toro Company, Minneapolis, Minn.

[21] Appl. No.: 970,628

[22] Filed: Dec. 18, 1978

[51] Int. Cl.³ ............................................. A47L 5/14
[52] U.S. Cl. ........................................., 15/330; 15/338; 15/405; 29/156.4 R; 29/401.1; 30/122
[58] Field of Search ................. 15/328, 338, 405, 406, 15/330; 29/156.4 R, 401 B; 30/122

[56] References Cited

U.S. PATENT DOCUMENTS

| 2,024,367 | 12/1935 | Eriksson-Jons | 15/330 |
| 2,671,923 | 3/1954 | La Briere | 15/339 X |
| 2,983,057 | 5/1961 | Erickson | 15/328 X |
| 3,142,913 | 8/1964 | Jacob | 15/328 X |
| 3,241,173 | 3/1966 | Finn | 15/328 |
| 3,286,376 | 11/1966 | Wildes | 15/328 X |
| 3,618,157 | 11/1971 | Bassin | 15/330 |
| 3,995,348 | 12/1976 | Chernosky | 15/328 |
| 4,187,577 | 2/1980 | Hansen et al. | 15/328 |

*Primary Examiner*—Christopher K. Moore
*Attorney, Agent, or Firm*—Merchant, Gould, Smith, Edell, Welter & Schmidt

[57] ABSTRACT

An attachment for converting a conventional filament trimmer into a vacuum or blower for removal of grass clippings. The attachment includes a fan housing removably mounted to the trimmer in either a vacuum or blower mode of operation and a fan removably mounted to the rotatably driven shaft of the trimmer. The fan housing has an air inlet scoop and air discharge chute.

3 Claims, 11 Drawing Figures

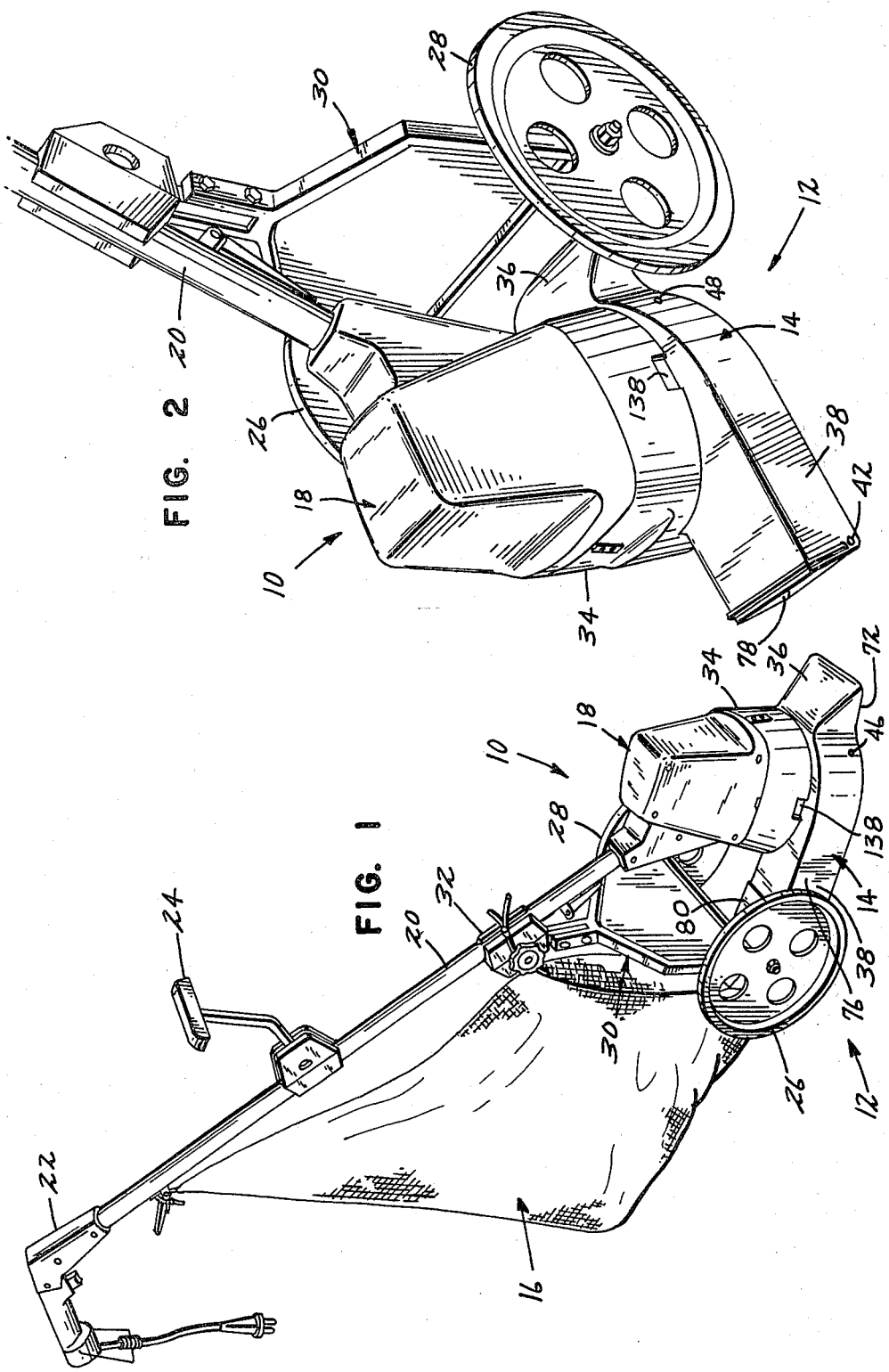

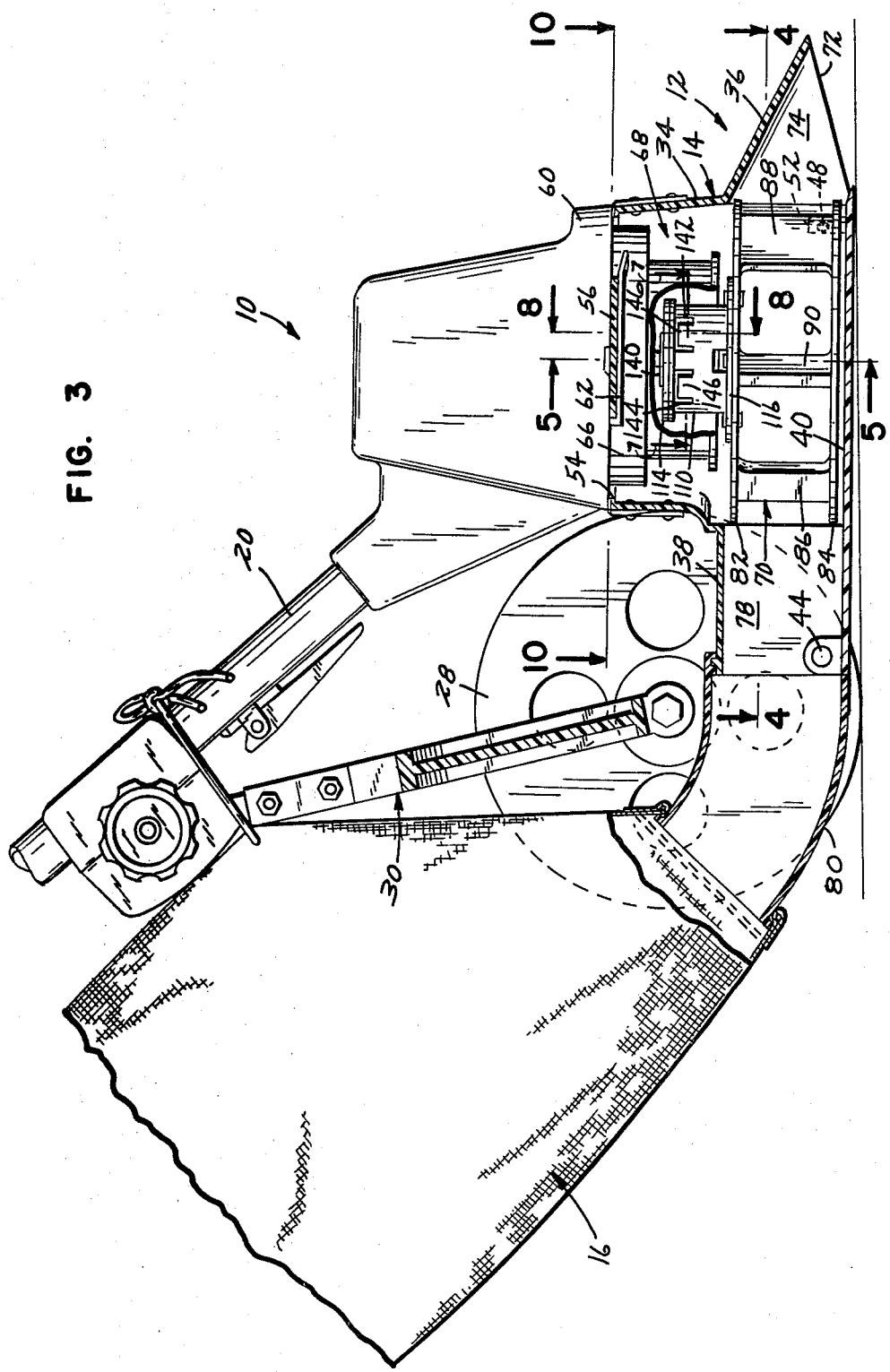

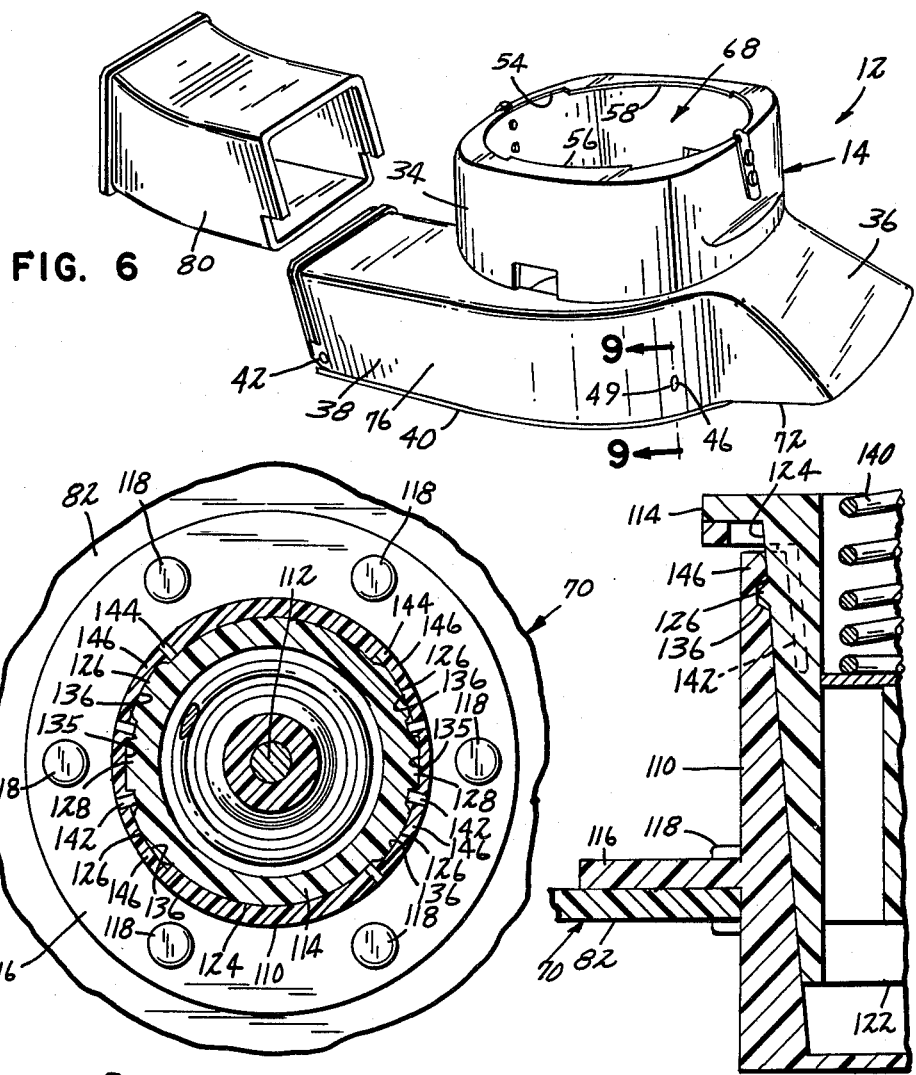
FIG. 6
FIG. 7
FIG. 8
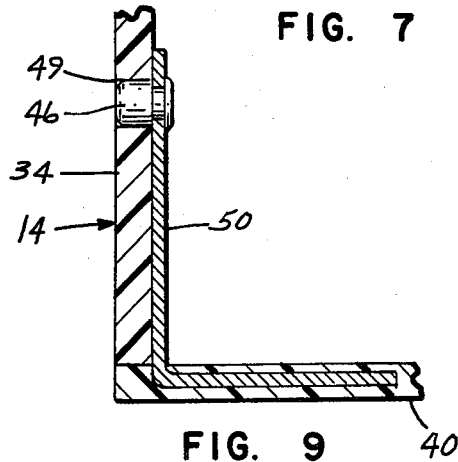
FIG. 9

VACUUM/BLOWER ATTACHMENT FOR FILAMENT TRIMMER

BACKGROUND OF THE INVENTION

The present invention relates broadly to an apparatus that can be adapted for use as a vacuum or blower to collect or remove grass clippings or other debris around patios, pools, driveways, walkways, etc. In particular, the present invention relates to an attachment for conventional filament line trimmers which converts the conventional trimmer into an apparatus for removal of the grass clippings generated during the trimming operation.

Filament line trimmers are well known in the art and many such trimmers are presently commercially available from various manufacturers. Generally, a conventional filament line trimmer includes an electric motor or gas engine that rotatably drives a filament line at a relatively high rate of speed to cut grass and in particular to trim about the edges of swimming pools, patios, driveways and walkways, for example. The conventional line trimmer typically includes a spool of cutting filament which is attached to the shaft of the rotating electric motor or gas engine.

Prior to the present invention, there existed no adequate and efficient means of collection or removal of the grass clippings generated by the trimmer. Essentially, the clipping may be left dispersed on the patio or walkway etc. and create an unsightly appearance. After the trimming operation, prior to the present invention, one had to manually sweep the clippings away or elect to leave the clippings where they were deposited.

The present invention therefore provides a simple and convenient apparatus for collection of unsightly clippings and debris deposited by a filament line trimmer. In particular the present invention encompasses an attachment which converts the filament line trimmer into either a vacuum or blower device that can in the vacuum mode simply collect and bag the clippings and debris, or in the blower mode of operation can drive the clippings away from their dispersed location or blow the clippings to a central pile where they then can be collected for disposal thereof. Therefore, the unsightly appearance left by clippings generated by operation of a filament line trimmer is eliminated and the necessary operator time to collect and remove the clippings is significantly reduced.

SUMMARY OF THE INVENTION

The present invention is a vacuum/blower apparatus adapted for removal of grass clippings and other debris generated by a filament line trimmer and includes a first housing with means connected thereto for supporting the housing in close proximity to the ground surface. The apparatus further includes a second housing that is removably attached to the first housing in a first position corresponding to the vacuum mode of operation and a second position corresponding to a blower mode of operation. The second housing is provided with an inlet air scoop and an outlet air discharge chute. A fan means is disposed within the second housing for drawing air into the second housing through the air inlet scoop and expelling the air and entrapped grass clippings and debris through the air discharge chute. Means are provided for rotatably driving the fan and the driving means is mounted within the first housing. Finally, means are provided for securing the fan to the driving means.

In the preferred embodiment, the present invention is an attachment for a conventional filament line trimmer having a rotatably driven shaft with means thereon for normally securing a filament line spool to the shaft. The attachment includes a fan member having a central axis and at least one blade member disposed about the central axis. The fan member has means thereon which cooperates with the securing means on the shaft for removably mounting the fan member to the shaft with the central axis of the fan member aligned with the rotational axis of the shaft of the filament line trimmer. The attachment further includes a housing that is removably attached to the trimmer and which defines an enclosed air chamber in which the fan member is disposed. The housing has an air inlet opening and an air outlet opening whereby upon rotation of the fan air is drawn into the housing through the air inlet and discharged from the housing through the air outlet.

The fan housing includes a generally cylindrical central portion which defines an enclosed air chamber in which the fan member is mounted, an inlet air scoop portion which defines an air inlet opening into the enclosed air chamber, and a discharge chute portion extending generally tangentially with respect to the central portion to define an air discharge passageway and air outlet. The fan comprises a substantially planar plate member lying in a plane substantially perpendicular to the rotational axis and central axis of the fan. At least one, and preferably a plurality of blade members are mounted to the plate member and spaced apart about the outer periphery thereof. The blade members each have working surfaces lying in planes substantially perpendicular to the plate member and disposed at an angle with respect to a line drawn from the outer edge of the blade member through the central axis of the fan such that the working surfaces are canted generally rearwardly with respect to the rotational direction of the fan.

With the fan housing in a first or vacuum position, the air scoop portion extends forwardly of the trimmer while the air discharge chute extends generally rearwardly for connection to a removable collection bag. In a second or blower mode of operation, the air scoop portion extends generally rearwardly of the trimmer while the air discharge chute extends forwardly thereof.

In the preferred embodiment, the fan and fan housing of the vacuum/blower attachment can easily be mounted to the conventional filament line trimmer to convert the trimmer into an apparatus for removal of the clippings and debris generated by the filament line trimmer. From the above description, it can be seen that the present invention can be operated in either a vacuum mode wherein the clippings are collected in a bag or a blower mode of operation whereby the clippings and debris can be dispersed by a blast of discharge air from the housing and/or driven to a single pile for collection and removal. Thus, the operator of the filament line trimmer is no longer faced with the unpleasant choice of either allowing the clippings and debris to leave an unsightly appearance or spend considerable time and labor in manually sweeping the clippings away. After the trimming operation is done with the present invention the operator can simply convert his trimmer to an apparatus that will quickly and efficiently remove the dispersed clippings and debris. These and other advantages will become apparent with reference to the accompanying drawings, detailed description of the preferred embodiment and claims.

BRIEF DESCRIPTION OF THE DRAWINGS

FIG. 1 is a view in perspective showing the present invention in the vacuum mode of operation;

FIG. 2 is an enlarged fragmentary view in perspective illustrating the present invention in the blower mode of operation;

FIG. 3 is an enlarged side elevational view shown partly in section;

FIG. 6 is a view in perspective illustrating the fan housing of the present invention;

FIG. 7 is an enlarged horizontal sectional view as seen from the line 7—7 of FIG. 3 showing the connection of the fan member of the present invention to the rotating shaft of the apparatus;

FIG. 8 is an enlarged fragmentary view in section as seen from the line 8—8 of FIG. 3 also illustrating the connection of the fan member of the present invention to the rotating shaft of the apparatus;

FIG. 9 is an enlarged fragmentary view in section as seen from the line 9—9 of FIG. 6;

DETAILED DESCRIPTION OF THE PREFERRED EMBODIMENT

Figure 4:
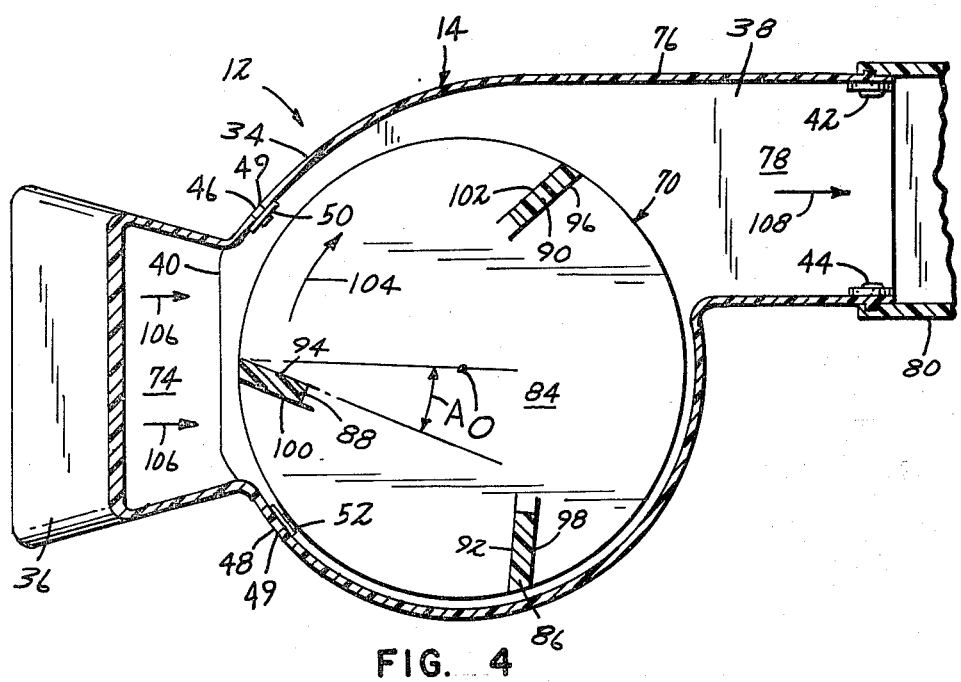
FIG. 4 is a horizontal sectional view taken generally along line 4—4 of FIG. 3.

Referring to the drawings, wherein like numerals represent like parts throughout several views, FIGS. 1 and 2 are views in perspective illustrating a filament trimmer 10 having a vacuum blower attachment designated generally as 12. In FIG. 1 attachment 12 is shown in a first position wherein air and entrapped grass clippings are drawn into a housing 14 of attachment 12 and collect in a bag 16. In FIG. 2, housing 14 of attachment 12 is disposed in a second position such that air is blown forwardly from housing 14 and attachment 12 operates in a blower mode.

In the preferred embodiment, it is contemplated that trimmer 10 may be a conventional filament line type grass trimmer that includes a motor housing 18. As will be described in more detail hereafter, housing 18 encloses typically an electric motor having a shaft to which is releasably attached a spool of cutting filament line. Housing 18 is mounted at the end of a support rod 20 the opposite end of which has a handle 22 that houses the on/off controls for the electric motor. Intermediate the ends of support rod 20 a second manual grasping handle 24 may be provided to facilitate operator control and maneuverability of trimmer 10. For the purpose of utilizing trimmer 10 with attachment 12, a pair of ground engaging wheels 26 and 28 are connected to rod 20 by a wheel support member 30. In the preferred embodiment wheel support member 30 may be adjustably mounted to rod 20 by means of a bracket 32 such that attachment 12 may be disposed in an appropriate position with respect to the ground surface.

It should be understood that, while the preferred embodiment of the present invention is disclosed as a trimmer with a vacuum/blower attachment, a vacuum/blower apparatus as shown in FIG. 1 wherein an electric motor normally drives a fan (not shown in FIGS. 1 and 2) and wherein the fan is enclosed by housing 14 that may be mounted in two positions is also within the spirit and scope of the present invention. For the sake of further discussion and explanation, however, reference will be made only to the preferred embodiment wherein a fan member may be removably attached to a shaft of an electric motor which may also rotatably drive a filament line spool.

FIG. 3 illustrates in more detail the present invention in the vacuum mode of operation. Housing 14 has a central portion 34 which may be generally cylindrical, an intake scoop portion 36 and a discharge chute portion 38. Housing 14 is enclosed at its bottom end by a closure member 40 which is pivotally mounted to chute portion 38 at 42 and 44. Closure member 40 is also attached to central portion 34 of housing 14 by means of a pair of pins 46 and 48 which mate with apertures 49 in central portion 34 and which are mounted to somewhat resilient arms 50 and 52 secured to closure member 40. As shown in more detail in FIGS. 5 and 6, central portion 34 of housing 14 has an opening 54 at the top thereof. Disposed about opening 54 are projecting members 56 and 58 which are received snugly between a bottom portion 60 of housing 18 and projecting ramp members 62 and 64 on a downwardly extending cylindrical portion 66 of bottom portion 60. The connection between ramp member 62 and 64 and projecting members 56 and 58 is essentially a bayonet-type connection for housing 14 to be secured to housing 18. Central portion 34 of housing 14 in conjunction with closure member 40 thus defines an essentially enclosed chamber 68 in which is mounted a fan member 70 as will be described in more detail hereafter. Scoop portion 36 has a bottom lip 72 which tapers upwardly with respect to the horizontal from a point generally proximate closure member 40 to the outer edge of portion 36. Scoop portion 36 thereby defines an intake air channel at 74 opening into enclosed chamber 68. Discharge chute portion 38 is disposed generally on the opposite side of central portion 34 from intake chute portion 36. Discharge chute portion 38 may also be described as having an outer wall 76 which projects generally tangentially with respect to central portion 34. Discharge chute portion 38 in conjunction with closure member 40 defines an air outlet passageway at 78 which opens into enclosed chamber 68 and is generally tangential with respect thereto. An extension member 80 may be provided to connect discharge chute portion 38 to bag 16.

Figure 5:
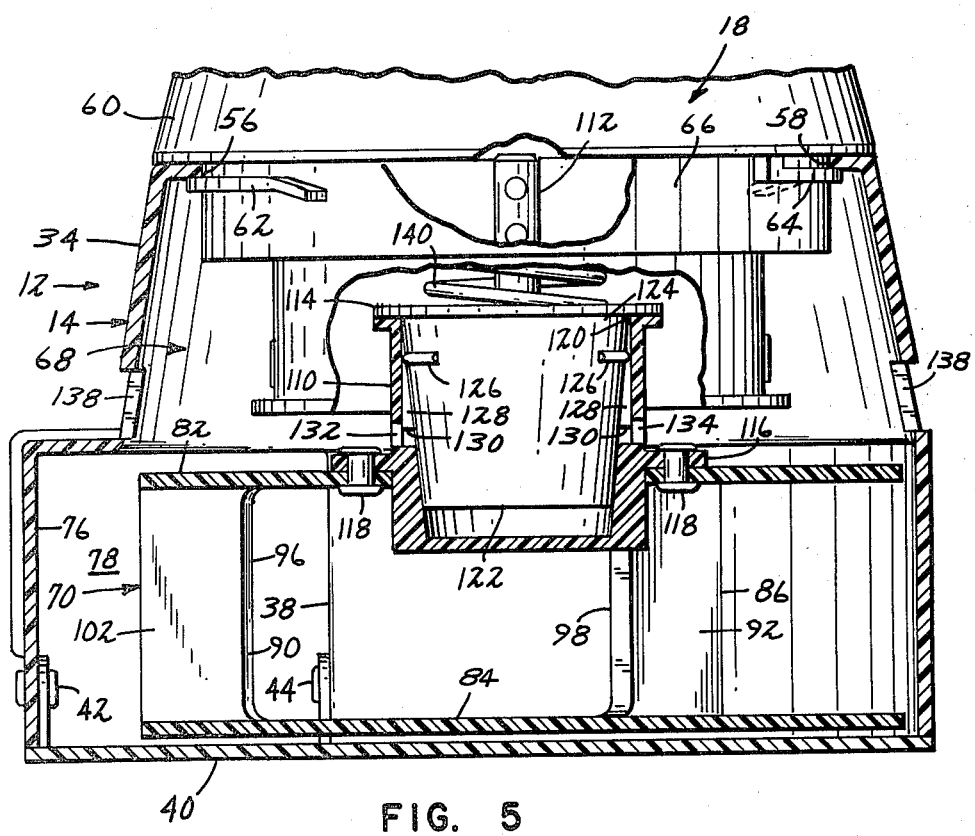
FIG. 5 is a view in section with parts thereof broken away and taken generally along the line 5—5 of FIG. 3.

Fan member 70 is illustrated specifically in FIGS. 3–5. In the preferred embodiment shown herein, fan member 70 includes a top planar disc member 82 and a bottom planar disc member 84. Fan member 70 has a central axis which is aligned with the rotational axis of the shaft of the motor of trimmer 10 as will be described in more detail hereafter. Disc members 82 and 84 are spaced apart in parallel planes along the central axis of fan member 70. Spaced apart circumferentially about fan member 70 and extending between planar disc members 82 and 84 are a plurality of blade members 86, 88 and 90. Blade members 86–90 lie in planes generally normal to the parallel planes of disc members 82 and 84. Each blade member 86–90 has a working surface 92, 94 and 96, respectively, and a trailing surface 98, 100 and 102, respectively. As shown particularly with respect to blade member 88, the working surfaces 92, 94 and 96 of blade members 86–90 lie in planes generally normal to disc members 82 and 84 and are disposed at an angle A with respect to a line drawn from the outer extremity of the blade member through the geometric center O of fan member 70. It has been found that such alignment of working surfaces 92–96 provides for maximum efficiency of air flow through attachment 12. As shown in FIG. 4, fan member 70 is rotatably driven in the direction indicated by arrow 104 so that blade members 86–90 draw air in through scoop portion 36 as indicated by the arrows 106 and expell air through discharge chute portion 38 as indicated by the arrow 108. Working surfaces 92, 94 and 96 can thus be defined as being canted rearwardly with respect to the direction of rotation 104 of fan member 70.

Fan member 70 includes a hub member 110 positioned about its central axis for attachment to the shaft of an electric motor (not shown). The shaft of the electric motor includes in the preferred embodiment a rod member 112 which is rotatably driven by the motor and which has an outer end portion 114 adapted to mate with hub member 110. As disclosed herein, hub member 110 may be affixed to disc member 82 by an annular flange portion 116 and suitable fastening means 118. Hub member 110 is essentially tubular and has an open end at 120 into which end portion 114 is received. End portion 114 is substantially frusto-conical in shape having a smaller diameter outer end at 122 and a larger diameter inner end at 124 with tapering side walls therebetween. A plurality of projecting members as shown at 126 are disposed on the outer surface of the frusto-conical end portion 114 and spaced apart about its circumference. Projecting members 126 are also positioned proximate inner end 124. End portion 114 also includes a pair of projecting members 128 on the outer surface thereof which extend longitudinally along end portion 114 and which terminate at a point along the central axis of end portion 114 to define a contact surface at 130. Hub member 110 is provided with a pair or apertures at 132 and 134 which are aligned generally with contact surfaces 130 when fan member 70 is positioned securely on end portion 114.

The engagement of hub member 110 with end portion 114 is shown in more detail in FIGS. 7 and 8. The inner surface of hub member 110 is provided with recesses for example at 135 and 136, in which are received projections 126 and 128. The side wall of hub member 110, particularly proximate opening 120, is somewhat resilient and flexible such that upon insertion of end portion 114 through open end 120 the side wall of hub member 110 will be spread apart sufficiently to permit projecting members 126, 128 to snap within recesses 135 and 136. Fan member 70 is thus securely but removably fastened to end portion 114 of the electric motor shaft.

To release fan member 70 from end portion 114 a screwdriver or other suitable means may be inserted through apertures 132 and 134 into contact with surfaces 130 and pressure exerted thereby to disengage projecting members 126, 128 from recesses 135 and 136, while pulling fan member 70 off end portion 114. For this purpose, apertures 138 may be provided in central portion 34 of housing 14 whereby a screw driver or other simple means can be inserted through apertures 138 and apertures 132 and 134 without removal of housing 14 from housing 18. As described and illustrated herein, an indexing spring 140 is shown in connection with end portion 114 and rod member 112 of the shaft of the electric motor. In this embodiment, spring 140 functions as part of an indexing system for line from a filament spool. It should be understood, however, that such indexing mechanism does not form a part of the present invention and that, the present invention encompasses alternative equivalent electric motor shaft and fan interconnection structures.

As shown in FIG. 3, hub member 110 may include slots formed therein at 142 and 144 which define wall portions 146 in which recesses 136 are formed. In the preferred embodiment, hub member 110 is formed of a suitable plastic material and wall portions 146 may flex outward to permit the placement of hub member 110 over end portion 114.

Figure 10:
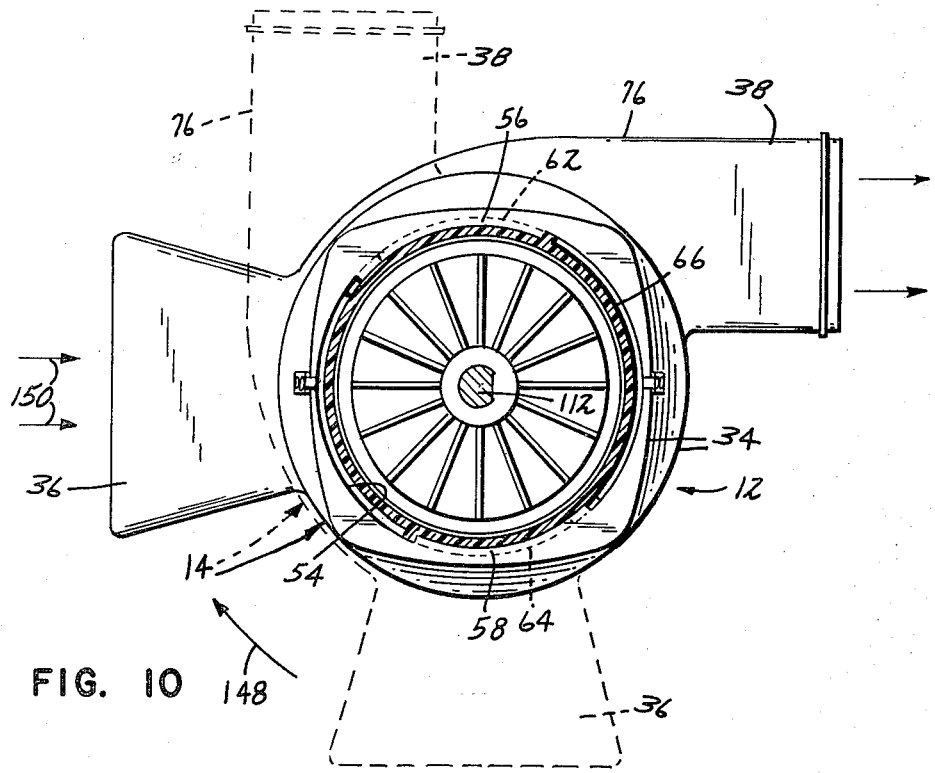
FIG. 10 is a horizontal sectional view as seen from the line 10—10 of FIG. 3 showing the connection of the housing of the present invention in the blower mode of operation.
Figure 11:
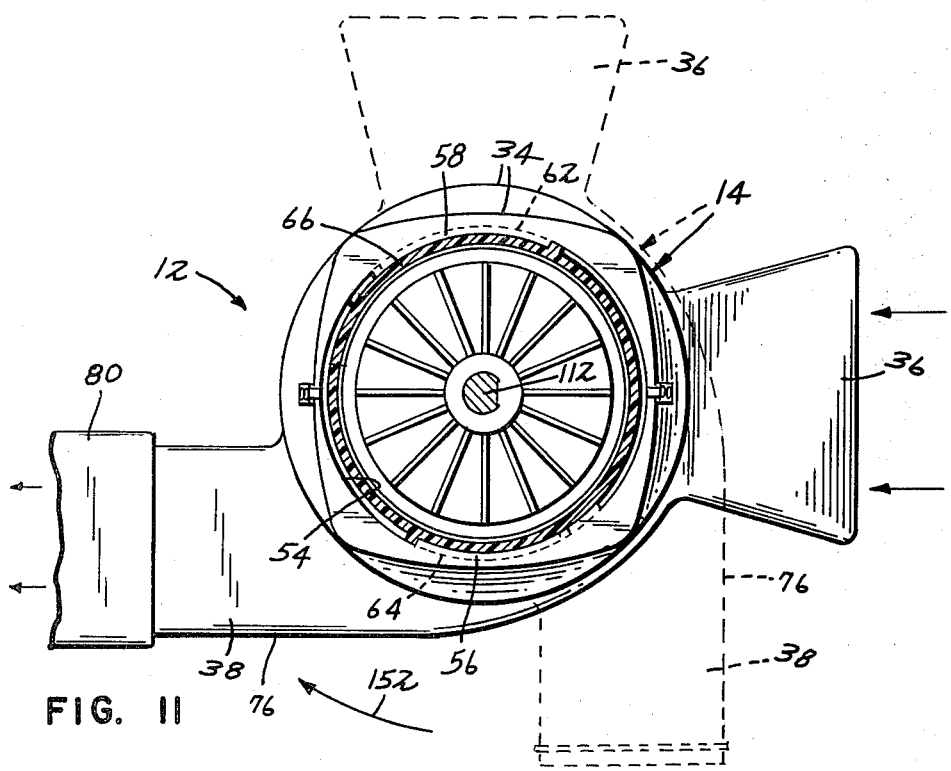
FIG. 11 is a view similar to FIG. 10 showing the connection of the fan housing of the present invention in the vacuum mode of operation.

FIG. 10 and 11 illustrate the attachment of housing 14 to housing 18 such that attachment 12 functions in either the blower mode (FIG. 10) or the vacuum mode (FIG. 11). To attach attachment 12 in the blower mode, housing 14 is positioned as shown in dashed lines and, with respect to FIG. 10, rotated in the clockwise direction as shown by the arrow at 148 whereby projecting members 56 and 58 are securely engaged between ramp members 62 and 64 and bottom portion 60 of housing 18. Housing 14 is then locked in position shown by the solid lines of FIG. 10 after rotation through approximately a 90 degree arc. Scoop portion 36 is then disposed generally rearwardly as shown in FIG. 2 and air is drawn in through scoop portion 36 as illustrated by arrows 150 and discharged through chute portion 38.

When it is desired to secure attachment 12 in the vacuum mode, housing 14 may be initially positioned as shown by the dashed lines in FIG. 11 or precisely in opposition to the position shown by dashed lines in FIG. 10. Housing 14 may then be rotated in the clockwise direction as shown in FIG. 11 and as illustrated by the arrow 152 to the position shown in solid lines whereby scoop portion 36 extends forwardly as shown in FIG. 1 while chute portion 38 is directed rearwardly. Again, the rotation of housing 14 will be generally through a 90 degree arc whereby members 56 and 58 engage and are captured by ramp members 62 and 64 between bottom portion 60 of housing 18.

In either the blower or vacuum modes of operation, fan member 70 is rotatably driven such that air is drawn in through scoop portion 36 and expelled generally tangentially from chamber 68 through passageway 78 defined by discharge chute 38 in conjunction with closure member 40. Thus, with attachment 12 in the vacuum mode as shown specifically in FIGS. 1 and 11, air containing entrapped grass clippings or other lightweight debris will be drawn into and through housing 14 and collected in bag 16. On the other hand, in the blower mode of operation, air and other entrapped debris or grass clippings will be ingested by scoop portion 36 and blown outward and forwardly through discharge chute 38 as shown specifically in FIGS. 2 and 10.

In the embodiment illustrated and described herein, fan member 70 is shown as having blade members 86, 88 and 90 each with working surfaces 92, 94 and 96, respectively aligned with respect to the rotational axis O of fan member 70 as previously described. It should be understood, however, that more than three such blade members may be utilized within the spirit and scope of the present invention or that alternative equivalent fan structure may also be utilized and considered within the spirit and scope of the present invention. Additionally, in the preferred embodiment housing 14 is typically positioned as desired prior to attachment of fan member 70. Once housing 14 is properly located and firmly secured with housing 18, closure member 40 may be opened and pivoted about pivot points 42 and 44. Fan member 70 is then simply inserted through the bottom of housing 14 and snapped onto end portion 114. Closure member 40 may then be locked into position to substantially enclose housing 14.

From the above description, it is apparent that the present invention is a device that can be operated in one mode to bag relatively small amounts of grass clippings or debris or can be utilized in another mode simply as a blower to sweep clippings or debris from unwanted areas of accumulation. In one embodiment, the present invention is a vacuum/blower attachment for convention filament line trimmers and includes a fan member that is attached in similar fashion and in place of a filament line spool to the shaft of the trimmer electric motor. A housing is adjustably mounted in two positions to substantially enclose the fan, the two positions corresponding to a vacuum mode and a blower mode of operation. Thus after an operator has trimmed a location with the filament line trimmer he may simply remove the filament line spool and attach the fan and housing to the filament line trimmer to either collect the grass clippings or blow them from the areas where they become deposited. The device of the present invention has particular applicability in the use of collecting or removing grass clippings about the edges of pools, patios, pedestrian walkways or driveways.

I claim:

1. An attachment for use with a filament line trimmer which has a shaft and means for rotatably driving the shaft, the shaft further having means thereon for normally securing a filament line spool thereto, comprising:
   (a) a fan member having a central axis and at least one blade member disposed about said axis, said fan member further having means thereon cooperating with the securing means on the shaft for removably mounting said fan member to the shaft with said central axis aligned with the rotational axis of the shaft; and
   (b) a housing removably attached to said trimmer and defining an enclosed air chamber in which said fan member is disposed, said housing having an air inlet and an air outlet opening whereby, upon rotation of said fan, air is drawn into said housing through said inlet and discharged from said housing through said outlet, said housing including:
       (i) a generally cylindrical central portion defining an enclosed air chamber in which said fan member is disposed;
       (ii) a scoop portion defining said air inlet opening, said scoop portion disposed peripherally with respect to said central portion and opening into said enclosed air chamber; and
       (iii) a discharge chute portion extending from said central portion and opening into said enclosed air chamber, said discharge chute portion further defining said air discharge outlet;
   and wherein said housing may be attached to said trimmer in a first position corresponding to a vacuum mode of operation with said inlet scoop extending forwardly and said discharge chute extending rearwardly with respect to said trimmer, and wherein said housing may be attached in a second position corresponding to a blower mode of operation with said discharge chute extending forwardly and said air scoop portion extending rearwardly with respect to the trimmer.

2. A vacuum/blower apparatus adapted for collection or removal of grass clippings or other debris, comprising:
   (a) a first housing, said housing having means connected thereto for supporting said housing in close proximity to the ground surface;
   (b) a second housing removably attached to said first housing in first and second positions corresponding to vacuum and blower modes of operation, respectively, said second housing having an inlet air scoop and an outlet air discharge chute, and said second housing comprising a central portion that is generally cylindrical in shape and which defines an air chamber in which said fan means is disposed, said inlet air scoop and said air discharge chute spaced apart circumferentially about said central portion of said second housing such that in said first position said air scoop extends forwardly with respect to said first housing while said discharge chute extends generally rearwardly with respect to said first housing while in said second position said air discharge chute extends forwardly with respect to said first housing while said inlet air scoop extends generally rearwardly with respect to said first housing;
   (c) fan means disposed within said second housing for drawing air into said second housing through said inlet scoop and discharging air through said discharge chute;
   (d) means for rotatably driving said fan, said driving means mounted within said first housing; and
   (e) means for securing said fan to said driving means.

3. A vacuum/blower apparatus in accordance with claim 2 wherein said air discharge chute defines an air discharge passageway disposed generally tangentially with respect to said enclosed air chamber defined by said central portion of said second housing.

* * * * *